United States Patent
Acharya et al.

(10) Patent No.: US 7,039,057 B1
(45) Date of Patent: May 2, 2006

(54) ARRANGEMENT FOR CONVERTING ATM CELLS TO INFINIBAND PACKETS

(75) Inventors: Yatin Acharya, Sunnyvale, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 859 days.

(21) Appl. No.: 09/907,586

(22) Filed: Jul. 19, 2001

(51) Int. Cl.
   *H04L 12/28* (2006.01)

(52) U.S. Cl. .............. 370/395.51; 370/395.6; 370/466; 370/474; 370/401

(58) Field of Classification Search .......... 370/395.1, 370/465, 395.52, 401, 466, 473, 474
   See application file for complete search history.

(56) References Cited

U.S. PATENT DOCUMENTS

| | | | |
|---|---|---|---|
| 6,275,494 B1 * | 8/2001 | Endo et al. | 370/395.52 |
| 6,459,698 B1 * | 10/2002 | Acharya | 370/392 |
| 6,522,667 B1 * | 2/2003 | Oda et al. | 370/474 |
| 6,711,167 B1 * | 3/2004 | Ikeda et al. | 370/395.1 |
| 6,788,706 B1 * | 9/2004 | Suzuki | 370/474 |
| 6,799,220 B1 * | 9/2004 | Merritt et al. | 709/238 |
| 6,826,196 B1 * | 11/2004 | Lawrence | 370/466 |
| 2004/0128398 A1 * | 7/2004 | Pettey | 709/249 |

OTHER PUBLICATIONS

William Stallings, "ISDN and Broadband ISDN with Frame Relay and ATM," 1998, Prentice-Hall, Inc, 4th Edition, pp. 438-450.*
Daniel Cassiday, InfiniBand™ Architecture Tutorial, Hot Chips, Aug. 2000, Sun Microsystems, 79 pages.

* cited by examiner

*Primary Examiner*—Ricky Q. Ngo
*Assistant Examiner*—Nittaya Juntima
(74) *Attorney, Agent, or Firm*—Manelli Denison & Selter PLLC; Leon R. Turkevich

(57) ABSTRACT

An ATM—InfiniBand™ router is configured for interfacing between an asynchronous transmission mode (ATM) network and an InfiniBand™ network, without a necessity of intermediate transport on a packet based network such as an Internet Protocol (IP) network. The router includes an ATM processor and a host channel adapter. The ATM processor is configured for generating ATM cells streams based on received InfiniBand™ packets, and recovering InfiniBand™ packet data from received ATM cells. The host channel adapter is configured for receiving the InfiniBand™ packets from the InfiniBand network and providing at least the payload data to the ATM processor, and outputting the recovered InfiniBand™ packet data onto the InfiniBand™ network. In addition, the ATM processor and the host channel adapter may be configured for mapping the ATM cells and the InfiniBand packets on prescribed virtual circuits and prescribed InfiniBand™ connections, respectively. Hence, the ATM—InfiniBand™ router operates as a call connection handler, enabling connections to be established across ATM and InfiniBand™ networks.

8 Claims, 3 Drawing Sheets

ARRANGEMENT FOR CONVERTING ATM CELLS TO INFINIBAND PACKETS

BACKGROUND OF THE INVENTION

1. Field of the Invention

The present invention relates to an apparatus configured for forwarding data packets from a prescribed network, such as an Asynchronous Transmission Mode (ATM) network, to a destination node in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/out (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between central processing units, peripherals, and switches inside a server system. Hence, the term "InfiniBand™ network" refers to a network within a server system. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading"), hence offloading the operating system of the server system.

The InfiniBand™ Architecture Specification describes a network architecture, illustrated in FIG. 1. The network 10 includes nodes 11 including channel adapters 12 or 14; for example, the nodes 11 include processor nodes 16, peripherals 18 such as Ethernet bridges or storage devices, routers 20, and InfiniBand™switches 22. Channel adapters operate as interface devices for respective server subsystems. For example, host channel adapters (HCAs) 12 are used to provide processor nodes 16 with an interface connection to the InfiniBand™ network 10, and target channel adapters (TCAs) 14 are used to provide the peripherals 18 with an interface connection to the InfiniBand™ network. Host channel adapters 12 may be connected to a memory controller 24 as illustrated in FIG. 1. Host channel adapters 12 implement the transport layer using a virtual interface referred to as the "verbs" layer that defines in the manner in which the processor 16 and the operating system communicate with the associated HCA 12: verbs are data structures (e.g., commands) used by application software to communicate with the HCA. Target channel adapters 14, however, lack the verbs layer, and hence communicate with their respective devices 18 according to the respective device protocol (e.g., PCI, SCSI, etc.).

The InfiniBand™ Architecture Specification requires that a packet to be sent via an HCA 12 undergoes transport layer service, followed by link layer service. Examples of operations performed during transport layer service include constructing a transport layer header, generating a packet sequence number, validating service type, etc. Examples of operations performed during link layer service include service layer and virtual layer mapping (SL-VL mapping), link layer flow control packet generation, link layer transmission credit checking, etc.

However, arbitrary hardware implementations may result in substantially costly hardware designs. In particular, problems may arise when attempting to deploy an InfiniBand™ network to send and receive data between other networks. For example, wide area networks (WAN) often rely on ATM switching technology to handle information transfer within a single network or between networks. ATM is a connection oriented, cell based switching technology that uses 53-byte cells to transport information. However, conventional approaches to connecting the InfiniBand™ network to a Metropolitan Area Network (MAN) or a Wide Area Network (WAN) may require an Asynchronous Transmission Mode (ATM) edge device that recovers an IP packet from ATM cells using a prescribed adaptation layer processing. The recovered IP packet then would be sent via an IP network to an IP router having a presence on the InfiniBand™ network. Such an arrangement can be substantially costly for smaller business consumers. In addition, disadvantages arise from converting between a connection-based transport protocols (e.g., ATM and InfiniBand™) and packet-based protocols such as Internet Protocol.

SUMMARY OF THE INVENTION

There is a need for an arrangement that enables an InfiniBand™ network to be connected to a Metropolitan Area Network, or a Wide Area Network utilizing connection-based transport protocols, in an efficient and economical manner.

There also is a need for an arrangement that enables an InfiniBand™network to be connected to a Metropolitan Area Network or a Wide Area Network by maintaining a connection-based transport protocol.

These and other needs are attained by the present invention, where an ATM—InfiniBand™ router is configured for interfacing between an asynchronous transmission mode (ATM) network and an InfiniBand™ network, without a necessity of intermediate transport on a packet based network such as an Internet Protocol (IP) network. The router includes an ATM processor and a host channel adapter. The ATM processor is configured for generating ATM cells streams based on received InfiniBand™ packets, and recovering InfiniBand™ packet data from received ATM cells. The host channel adapter is configured for receiving the InfiniBand™ packets from the InfiniBand network and providing at least the payload data to the ATM processor, and outputting the recovered InfiniBand™ packet data onto the InfiniBand™ network. In addition, the ATM processor and the host channel adapter may be configured for mapping the ATM cells and the InfiniBand packets on prescribed virtual circuits and prescribed InfiniBand™ connections, respectively. Hence, the ATM—InfiniBand™ router operates as a call connection handler, enabling connections to be established across ATM and InfiniBand™ networks.

One aspect of the present invention provides a method in network node. The method includes receiving, by a first network interface of the network node, a group of Asynchronous Transmission Mode (ATM) cells carrying packet data according to a prescribed channel/path connection. The method also includes recovering the packet data from the group of ATM cells according to adaptation layer processing, and outputting an InfiniBand™ packet carrying the packet data onto an InfiniBand™ network by a second network interface of the network node, according to a prescribed connection based on the prescribed channel/path connection.

Another aspect of the present invention provides a network node comprising a first network interface, a processor, and a second network interface. The first network interface is configured for receiving a group of Asynchronous Transmission Mode (ATM) cells carrying packet data according to a prescribed channel/path connection, and the processor is configured for recovering the packet data from the group of ATM cells according to adaptation layer processing. The second network interface is configured for outputting an InfiniBand™ packet carrying the packet data onto an InfiniBand™ network according to a prescribed connection based on the prescribed channel/path connection.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
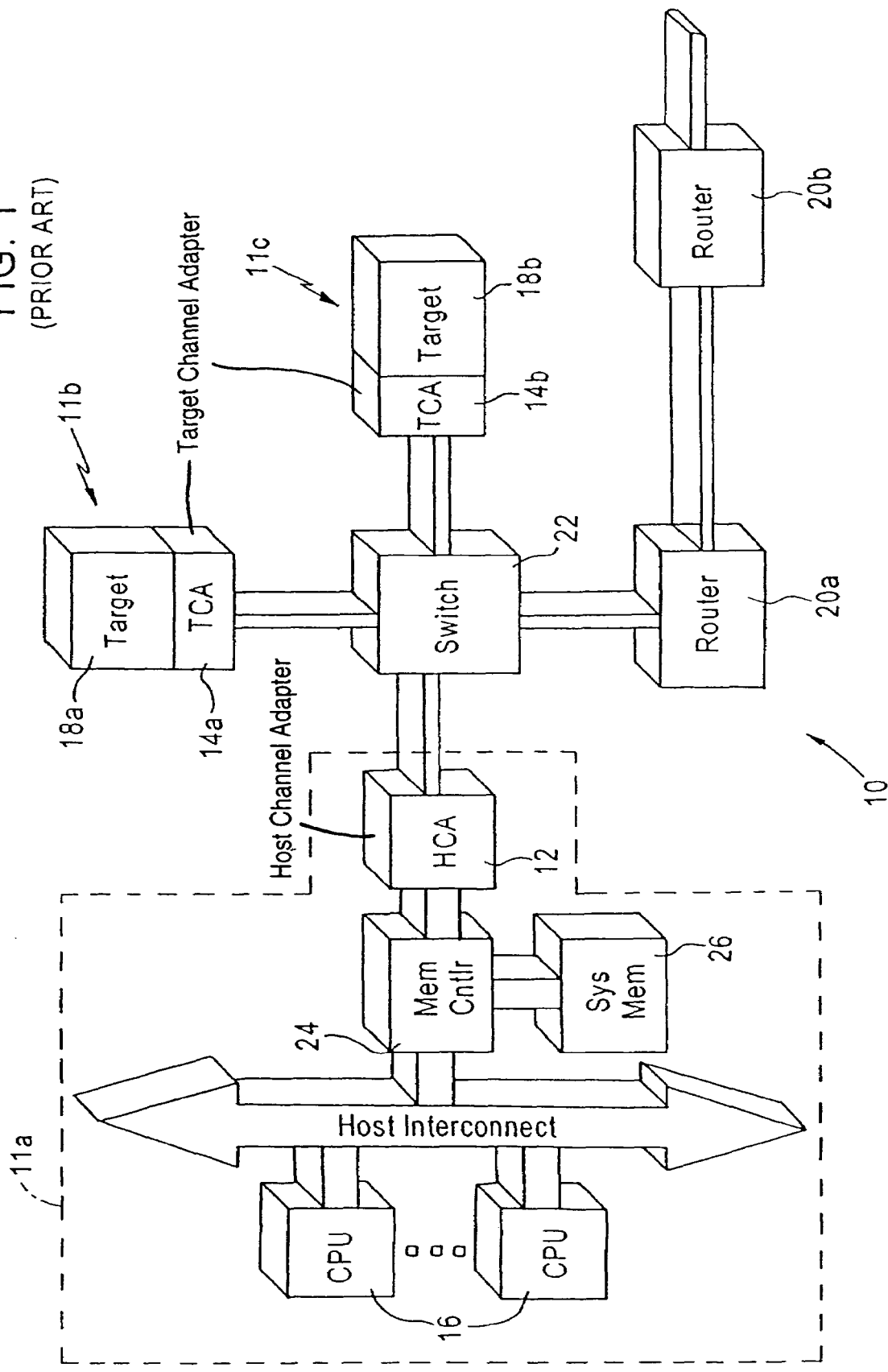
FIG. 1 is a block diagram illustrating a conventional network according to the InfiniBand™ Architecture Specification.
Figure 2:
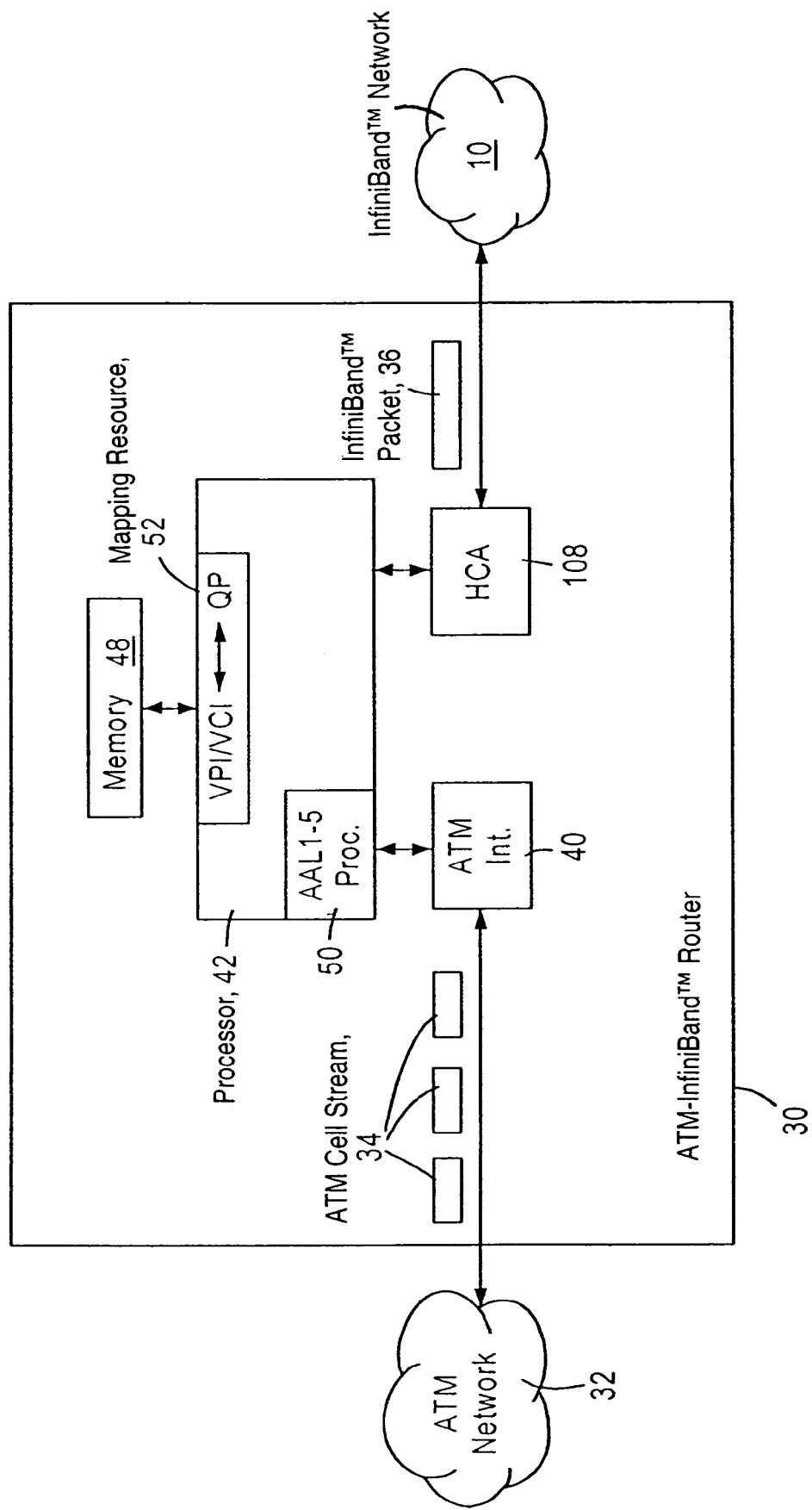
FIG. 2 is a diagram illustrating an ATM—InfiniBand™ router configured for interfacing between an ATM network and an InfiniBand™ network according to an embodiment of the present invention.

FIG. 2 is a block diagram illustrating an ATM—InfiniBand™ router 30 configured for interfacing between an ATM network 32 and the InfiniBand™ network 10 according to an embodiment of the present invention. The ATM—InfiniBand™ router 30, also referred to as a network node, is configured for receiving ATM cell streams 34 from the ATM network 32, recovering the payload from the ATM cell streams 34 using ATM adaptation layer processing, and outputting the payload as InfiniBand™ packets 36 according to the InfiniBand™ protocol.

In particular, the ATM—InfiniBand™ router 30 includes an ATM network interface portion 40, a processor portion 42, a buffer memory 48, and a host channel adapter (HCA) 108. The ATM network interface portion 40 is configured for receiving a group of ATM cells 34 from the ATM network 32. As recognized in the art, ATM is a connection oriented, cell based switching technology that uses 53-byte cells to transport information. Each cell 34 includes a 5-byte header and a 48 byte payload. Each five-byte header includes a virtual path identifier (VPI), a virtual channel identifier (VCI), a payload type (PTI), a cell loss priority (CLP) field, and a header error control (HEC) field. The ATM network interface portion 40 accepts and forwards to the processor portion 42 ATM cell streams 34 that have a VPI/VCI addressing that matches prescribed VPI/VCI ranges assigned to the network node 30.

The processor portion 42 includes an adaptation layer processor 50, and a mapping resource 52 configured for mapping received payload data to selected queue pair connections within the InfiniBand™ network 10, for example using internal lookup tables managed by an InfiniBand subnet manager (not shown). The adaptation layer processor 50 is configured for packaging application data into cells prior to transport, and extracting data from cells during reception. Hence, the adaptation layer processor 50 performs adaptation layer processing as needed to recover the payload from the ATM cell streams. In particular, the adaptation layer processor 50 may select from five available adaptation layers, AAL1 through AAL5, based on information specified within the ATM cell header. The adaptation layer AAL1 can be used for real-time, constant bit rate traffic such as voice and video traffic. AAL2 can be used to support real-time, variable bit rate traffic such as MPEG video traffic. AAL3 and AAL4 can be used to provide support for non-real-time data, or local area network traffic, although AAL5 typically is used for local area network traffic since AAL5 has lower overhead per cell and a simpler encapsulation protocol.

The mapping resource 52 is configured for mapping payload data from prescribed VPI/VCI channels to selected queue pairs (QPs). Since a given queue pair may be used to support a corresponding connection (e.g., reliable connection, unreliable connection, reliable diagram, unreliable datagram), information within the ATM cell header can be used to map the corresponding payload to a selected InfiniBand connection. The mapping resource would map the ATM connection attributes to a Service Level defined for the Infiniband network.

Conversely, a given InfiniBand packet may be mapped to a prescribed VPI/VCI channel, and undergo a selected adaptation layer processing, based on header information within the InfiniBand packet. The memory 48 is used to store data during transfer between the adaptation layer processor 50 and the host channel adapter 108.

Hence, the ATM—InfiniBand router 30 can interface between the ATM network 32 and the InfiniBand network 10, while maintaining connection based information for high-priority traffic.

Figure 3:
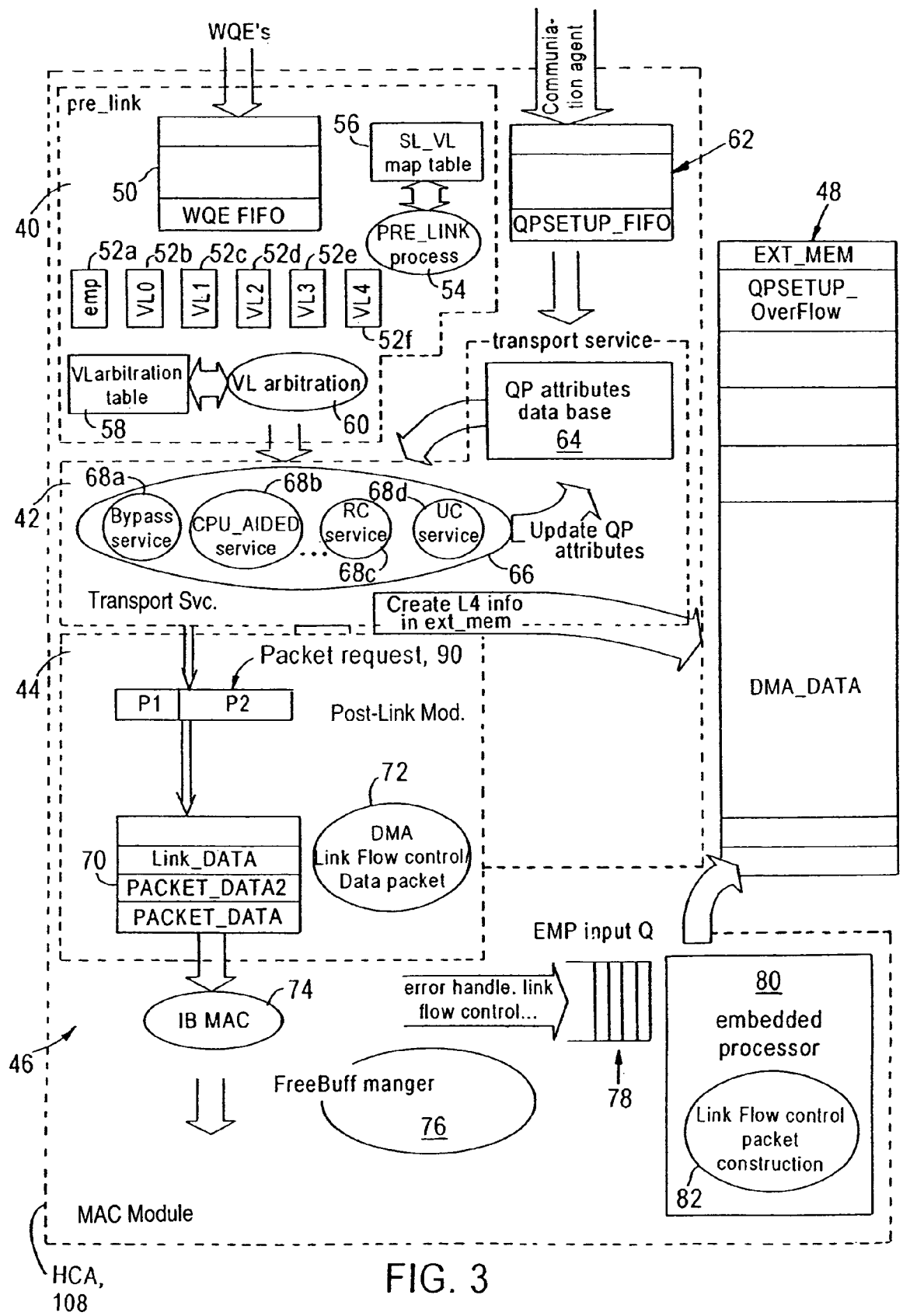
FIG. 3 is a diagram illustrating in detail the host channel adapter of FIG. 2.

FIG. 3 is a block diagram illustrating a host channel adapter (HCA) 108 configured for generating and transmitting packets according to an embodiment of the present invention. The HCA 108, compliant with the InfiniBand™ Architecture Specification, is implemented in a manner that ensures that hardware resources are efficiently utilized by generating transmit packets according to a priority-based ordering. In addition, the disclosed HCA 108 provides flexibility by enabling embedded processes to be added without disruption of traffic flow. Hence, the HCA 108 can be implemented in an economical manner with minimal complexity relative to conventional implementation techniques.

One problem with conventional arrangements for implementing the HCA 108 according to the InfiniBand™ Architecture Specification is that transport layer service would be performed first, for example by constructing a transport layer header, generating a packet sequence number, validating the service type (e.g., reliable connection, reliable datagram, unreliable connection, unreliable datagram, etc.), and other transport layer operations. Once the transport layer operations have been completed, the packet would be sent to the link layer service for link layer operations, including service layer and virtual lane mapping, link layer flow control packet generation, link layer transmission credit checking, and other operations. Although this conventional type of implementation has the advantage of precisely following the network layers specified in the InfiniBand™ Architecture Specification, such an arrangement requires a substantially large amount of hardware. In particular, the transport layer generally requires more processing power than the link layer because the transport layer involves more complex operations. Hence, there is a need that the implementation of the transport layer in hardware does not result in a substantially complex hardware system. In addition, there is a concern with unnecessarily wasting transport layer resources on low priority operations.

According to the disclosed embodiment, link layer operations are partitioned based on the desirability to determine priorities of data packets to be transmitted. In particular, the HCA 108 includes a pre-link module configured for determining a priority of received WQEs, and a post-link module configured for preparing a data packet for transmission on the network. The pre-link module 40 orders the WQEs according to priorities determined by the pre-link module, and outputs the WQEs in the determined order to a transport service module 42 configured for generating the appropriate transport layer headers for the WQEs based on the associated queue pair attributes. In other words, the pre-link module 40 prevents the transport service module 42 from wasting resources on low priority WQEs or blocking high priority WQE's within the transport layer process. Hence, higher priority connections obtain improved service at the transport layer through the HCA.

The HCA 108, implemented for example as an application-specific integrated circuit, includes a pre-link module 40, a transport service module 42, a post-link module 44, and a media access control (MAC) module 46. The HCA 108 also has local access to a memory 48 configured for storing transport data and overflow buffers, described below.

The pre-link module 40 includes a work queue element FIFO 50, virtual lane FIFOs 52, a pre-link process module 54, a service layer to virtual lane (SL-VL) mapping table 56, a virtual lane (VL) arbitration table 58, and a virtual lane (VL) arbitration module 60.

The HCA 108 is configured for receiving data from a central processing unit (CPU) in the form of work queue elements (WQEs), stored in the WQE FIFO 50. Each WQE specifies a corresponding request, from a consumer application executed by the CPU (i.e., "requester"), for a corresponding prescribed operation to be performed by a destination InfiniBand™ network node (i.e., "responder"), for example a target. The interaction between requester and responder is specified via a queue pair (QP), where a queue pair includes a send work queue and a receive work queue.

The WQE includes service level (SL) information, and a pointer to the location of the actual message in the system memory 48. The InfiniBand™ Architecture Specification defines a service level (SL) attribute that permits a packet traversing the InfiniBand™ network 10 to operate at one of sixteen available service levels. Hence, the requester can select an available service level (e.g., quality of service, priority, etc.) based on a selected priority of the WQE.

The pre-link module 40 provides both service level to virtual lane mapping (SL-VL mapping), and virtual lane arbitration. In particular, virtual lanes, defined in the InfiniBand™ Architecture Specification, enable multiple logical flows to be implemented over a single physical link, where link level flow control can be applied to one virtual lane without affecting other virtual lanes. The pre-link process module 54 is configured for managing and maintaining the service layer-virtual layer mapping table 56. In particular, the pre-link process module 54 retrieves a WQE from the WQE FIFO 50, and determines the corresponding virtual lane based on the service layer specified within the WQE. Upon identifying the appropriate virtual lane for the retrieved WQE, the pre-link process module 54 forwards the WQE to the corresponding virtual lane FIFO 52.

The pre-link module 40 includes virtual lane FIFOs 52a, 52b, 52c, 52d, 52e, and 52f for storage of WQEs based on the assignment by the pre-link process module 54. For example, the virtual lane FIFO 52a is used for storing WQEs associated with embedded processor operations, for example link layer control packets and handling of error conditions. In other words, when a prescribed operation is not implemented in hardware, the request is sent to an embedded processor queue 78 for further processing by an embedded processor 80, described below; hence the embedded processor 80 has its own assigned queue 52a for outputting packets into the flow of output data traffic. The virtual lane FIFO 52b is used for storing WQEs associated with management traffic. The virtual lane FIFOs 52c, 52d, 52e, and 52f are used for storing WQEs associated with respective assigned virtual lanes. Although the disclosed embodiment discloses the use of four assigned virtual lanes, additional virtual lane FIFOs may be added for additional assigned virtual lanes.

The VL arbitration module 60 is implemented as a state machine with registers, and is configured for managing the VL arbitration table 58 for servicing of the virtual lanes, including setup, management, and teardown of the virtual lanes. The VL arbitration module 60 also determines which virtual lane to service, and outputs the WQEs from the virtual lane FIFOs 52 based on the determined priority of the virtual lanes. For example, the virtual lane FIFO 52b typically stores management (high-priority) traffic, hence the VL arbitration module 60 typically would empty the virtual lane FIFO 52b before servicing the other virtual lane FIFOs 52c, 52d, 52e, or 52f. The VL arbitration module 60 would then selectively output the WQEs from the virtual lane FIFOs 52c, 52d, 52e, or 52f based on weighted priorities stored in respective weight tables within the VL arbitration table 58.

Hence, the pre-link module 40 outputs the WQEs in a prescribed order based on a determined priority of the WQEs, for example based on assigned virtual lanes, or whether the WQE is for an embedded process, management traffic, or flow control traffic.

The transport service module 42 is configured for managing transport services, including setup, management, and teardown of queue pairs. In particular, the HCA 108 includes a queue pair setup FIFO 62 configured for storing queue pair commands received from a communication management agent. The communication management agent is responsible for setup and teardown of transport connections: the communication management agent communicates with a subnet manager to establish the transport connections (i.e., queue pairs) for the HCA 108. In addition, the communication management agents at each end during connection establishment use a bypass service (described below with respect to bypass service submodule 68a), as opposed to a conventional transport layer service, to establish the transport connections.

The transport service module 42 includes a queue pair attributes database 64 and a queue pair attributes management module 66. The queue pair attributes management module 66 is configured for processing the queue pair commands in the queue pair setup FIFO 62, and updating the queue pair attributes database 64 based on the received queue pair commands. For example, the queue pair attributes database 64 stores information relating to a source queue pair number, a destination queue pair number, and possibly source agent and destination agent. Hence, the queue pair attributes database 64 will include all information necessary to support the different transport services, including reliable connection service, reliable datagram service, unreliable connection service, unreliable datagram service, and raw datagram service.

The queue pair attributes management module 66 manages the transport services by updating the queue pair attributes database 64 during communication between the local and remote communication agents, for example when packet sequence numbers increase as messages are exchanged between the local and remote communication agents.

The queue pair attributes management module 66 also includes service submodules 68, each configured for managing a corresponding transport service type based on a corresponding received WQE from the pre-link module 40. For example, the bypass service submodule 68a is configured for managing bypass services during connection establishment or managing queue pairs associated with management operations with network managers that use, for example, the raw datagram service. The CPU aided service submodule 68b is configured for managing queue pairs based on embedded processor operations using the embedded virtual lane FIFO 52a; hence, the CPU aided service submodule 68b enables coordination between the local and remote embedded processes; moreover, implementation of the CPU aided service submodule 68b in conjunction with the embedded virtual lane FIFO 52a enables messages to be retransmitted if a resend request is received from the remote communication agent. The reliable connection (RC) service submodule 68c and the unreliable connection (UC) service submodule 68d are configured for managing queue pairs associated with reliable connection and unreliable connection transport services, respectively. Although not shown, the queue pair attributes management module 66 also includes submodules 68 for managing reliable and unreliable datagram services, and raw datagram service.

Hence, the transport service module 42, upon receiving a WQE from the pre-link module 40, supplies the WQE to the appropriate submodule 68 for processing (e.g., WQE for RC service handled by the RC service submodule 68c). The WQE includes service level (SL) information, and a pointer to the location of the actual message in the system memory 48. The submodule 68, in response to reception of the appropriate WQE, parses the WQE, and retrieves from the WQE the pointer that identifies the memory location for the transport data (i.e., the payload for the transport layer); the submodule 68 performs a DMA fetch of the transport data, updates the appropriate queue pair attributes within the queue pair attributes database 64, and creates and stores in the external memory 48 a transport layer header for the WQE in a corresponding transport format; for example, the submodule 68a may generate a raw transport header, whereas the modules 68c or 68d may generate a transport header according to the reliable connection service or the unreliable connection service, respectively.

The submodule 68 then creates a header pointer (p1) that identifies the location of the transport layer header. The submodule 68 then sends to the post-link module 44 the payload pointer (p2) and the header pointer (p1) as a packet request 90, enabling the post-link module 44 to assemble the transport packet for transmission based on the supplied pointers. Alternately, the submodule 68 may generate a frame pointer to a system memory location that stores the transport layer frame, including the transport layer header and the transport data. If preferred, the submodule 68 also could forward the transport layer frame (including transport layer header and transport data) to the post-ink module. Alternately, while writing to the external memory, the CPU may leave blank spaces at the beginning of the data, so that the actual header information that is created within the modules 68 can be stored in the corresponding empty memory space. The pointer passed down to the post-ink module 44 could be this pointer which points to the beginning of the frame in the external memory.

The post-link module 44, in response to reception of the transport layer information (e.g., transport layer frame, packet request, etc.), fetches the transport layer header and the transport layer payload from the system memory 48 for generation of the transmit packet and storage in a transmit FIFO 70. In particular, the post-link module 44 also includes a link layer control module 72 configured for generating the transmit packet by generating link layer fields (e.g., local and global routing headers, cyclic redundancy check (CRC) fields, etc.), storage of the transmit packet in the transmit FIFO 70, and handling link layer control operations according to the InfiniBand™ Architecture Specification. Once the transmit packet has been generated, the pointers are forwarded to the free buffer manager 76, described below.

The link layer control module 72 outputs the transmit packets according to a credit-based flow control. In particular, the link layer control module 72 monitors the available credits for transmission of a transmit packet on the assignment virtual lane. In particular, credits are sent on a per virtual lane basis, where a receiver issues a credit based on packets taken from an incoming virtual lane buffer; the credits are sent to the sender, enabling the sender to manage flow control. Hence, if the link layer control module 72 determines that an identified virtual lane has an insufficient number of credits, the link layer control module 72 defers transmission of the corresponding transmit packet until a sufficient number of credits have been received. If the virtual lane has a sufficient number of credits, the link layer control module 72 forwards the transmit packet to the MAC module 46 for transmission.

The MAC module 46 is configured for outputting the transmit packet stored in the transmit FIFO 70 according to the InfiniBand™ Architecture Specification. In particular, the MAC module 46 includes a transmission module 74, a free buffer manager 76, an embedded processor input queue 78, and an embedded processor 80 having a link flow control packet construction module 82. The transmission module 74 is configured for performing media access control operations, and optionally physical layer transceiver operations, for transmission of the transmit packet onto the InfiniBand™ network 10.

The free buffer manager 76 is configured for releasing available space from the external memory 48 once the transmit packet has been successfully received by the responder. In particular, the memory pointers for a transmit packet are sent from the post-link module 44 once the transmit packet has been generated; if a responder sends a message that the transmit packet needs to be resent in a reliable connection service, the transmit packet can be regenerated by the post-link module 44 and retransmitted to the responder. Once the transmit packet is successfully received, the frame pointers can be released for use by another agent.

Flow control is handled by the embedded processor 80 based on reception of information from the embedded processor input queue 78: in particular, the flow control protocol according to the InfiniBand™ Architecture Specification uses a credit-based flow control. The embedded processor 80 generates link flow control packets using the link flow control packet construction module 82, based on messages stored into the embedded processor input queue 78. The embedded processor 80 writes the link flow control packet to external memory 48; the embedded processor 80 then generates a WQE that includes the associated operation and a pointer specifying the location of a flow control packet into the embedded processor virtual lane FIFO 52*a*. The link flow control packet can then be output, specifying a number of available credits for another transmitting note.

Hence, the embedded processor 80 can generate a link flow control frame including the flow control header, and output the link flow control frame to the error processor input queue 78 for transmission to the network.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network node, the method comprising:
   receiving, by a first network interface of the network node, a group of Asynchronous Transmission Mode (ATM) cells carrying packet data according to a prescribed channel/path connection;
   recovering the packet data from the group of ATM cells according to adaptation layer processing; and
   outputting an InfiniBand packet carrying the packet data onto an InfiniBand network by a second network interface of the network node, according to a prescribed connection based on the prescribed channel/path connection, the outputting including selecting a queue pair to establish the prescribed connection based on the prescribed channel/path connection.

2. The method of claim 1, further comprising:
   receiving a second InfiniBand packet by the second network interface;
   fragmenting at least a payload of the second InfiniBand packet into fragments; and
   outputting a second group of ATM cells, carrying the respective fragments, on a second prescribed channel/path connection based on information within the second InfiniBand packet.

3. The method of claim 2, wherein the fragmenting step includes performing a prescribed adaptation layer processing selected based on information within the second InfiniBand packet.

4. The method of claim 1, wherein the outputting step is performed by a host channel adapter.

5. A network node comprising:
   a first network interface configured for receiving a group of Asynchronous Transmission Mode (ATM) cells carrying packet data according to a prescribed channel/path connection;
   a processor configured for recovering the packet data from the group of ATM cells according to adaptation layer processing; and
   a second network interface configured for outputting an InfiniBand packet carrying the packet data onto an InfiniBand network according to a prescribed connection based on the prescribed channel/path connection;
   wherein the processor is configured for selecting a queue pair to establish the prescribed connection based on the prescribed channel/path connection.

6. The network node of claim 5, wherein the second network interface is configured for receiving a second InfiniBand packet, the processor fragmenting at least a payload of the second InfiniBand packet into fragments, the first network interface outputting a second group of ATM cells, carrying the respective fragments, on a second prescribed channel/path based on information within the second InfiniBand packet.

7. The network node of claim 6, wherein the processor is configured for fragmenting the at least a payload using a prescribed adaptation layer processing selected based on information within the second InfiniBand packet.

8. The network node of claim 5, wherein the second network interface is a host channel adapter.

* * * * *